United States Patent Office 3,386,800
Patented June 4, 1968

3,386,800
METHOD FOR THE PREPARATION OF CATA-
LYSTS FOR THE SYNTHESIS OF HETEROCY-
CLIC DIAMINES
Walter H. Brader, Jr., Austin, Tex., assignor to Jefferson Chemical Company, Inc., Houston, Tex., a corporation of Delaware
No Drawing. Original application Aug. 31, 1964, Ser. No. 396,792, now Patent No. 3,342,820, dated Sept. 19, 1967. Divided and this application Mar. 28, 1966, Ser. No. 537,651
4 Claims. (Cl. 23—105)

ABSTRACT OF THE DISCLOSURE

Complex, amorphous phosphate salts of alkali metals and trivalent metals are prepared by mixing an aqueous solution of alkali metal phosphate with an aqueous solution of trivalent phosphate, removing water so as to provide a complex phosphate salt of alkali metal and trivalent metal and calcining the complex salt at a temperature of about 300° to 500° C.

---

This application is a division of Brader application Ser. No. 396,792 (now U.S. Patent No. 3,342,820), filed Aug. 31, 1964, which, in turn, is a continuation-in-part of Brader et al. application Ser. No. 371,098 (now U.S. Patent No. 3,297,705), filed May 28, 1964, and entitled, "Synthesis of Heterocyclic Diamines"; said application Ser. No. 371,098 being, in turn, a continuation of abandoned Brader et al. application Ser. No. 317,761 and Brader et al. abandoned application Ser. No. 317,814, both filed Oct. 21, 1963; both being, in turn, continuation-in-part applications based upon abandoned Brader et al. application Ser. No. 182,122, filed Mar. 23, 1962, and entitled "Synthesis of Heterocyclic Compounds."

It has heretofore been proposed by me and by others to prepare diazabicyclo - (2.2.2) - octane (commonly referred to as triethylenediamine) by catalytically cyclizing a compound such as ethylenediamine, diethylenetriamine, triethylenetetramine, N-aminoethylpiperazine, etc., in the presence of very limited class of catalysts that have been found to be appropriate. The work that has heretofore been done by me and by others on the preparation of triethylenediamine has established that catalysts of an acidic character are needed. For example, Ishiguro employed a silica - alumina catalyst in converting N - hydroxyethyl-piperazine to triethylenediamine (Ishiguro, J. Pharm. Soc., Japan, 75, 1370; 1955). The use of silica-alumina or kaolin has also been reported in the preparation of triethylene diamine (Krause U.S. Patent No. 2,985,658, Herrick U.S. Patent No. 2,937,176, Farkas et al. U.S. Patent No. 2,977,363 and Mascioli U.S. Patent No. 2,977,364). German workers have prepared triethylenediamine by heating an appropriate feed stock with a high boiling carboxylic acid, such as lauric acid, to obtain triethylenediamine (Spielberger et al. U.S. Patent No. 3,080,371). This latter method, however, involves a liquid phase reaction and gives excessive amounts of residue. Also, the reaction is slow, generally requiring one or two days for completion. In the course of my prior investigations, I have discovered that triethylenediamine can be prepared using a base-treated silica-alumina catalyst (U.S. Patent No. 3,120,526) which, after treatment, is still acidic, or a tungsten oxide catalyst (U.S. Patent No. 3,056,788).

As shown by my above-identified patent applications, I, and my co-workers, have also investigated the preparation of C-substituted triethylenediamines. However, during the course of this work, I have discovered that the catalyst requirements for making C-substituted triethylenediamines such as 2 - methyltriethylenediamine (MTEDA) are quite different from the catalyst requirements for making triethylenediamine. This is shown, for example, by the different results obtained under essentially identical reaction conditions when converting N-aminoethylpiperazine to triethylenediamine and when converting N-hydroxyethyl-2-methylpiperazine to 2 - methyl-triethylenediamine with catalysts as heretofore suggested.

In obtaining the data, the experiments were carried out in a jacketed stainless steel reactor at a temperature within the range of about 375°–410° C., at atmospheric pressure, by passing the feed stock (i.e., N-hydroxyethyl-2-methylpiperazine for MTEDA and N-aminoethylpiperazine for TEDA) through a catalyst bed in the reactor in the presence of ammonia at a feed space velocity of from about 0.5 to 1 and an ammonia space velocity of about 0.1 to about 0.2 gram per cubic centimeter of catalyst per hour.

Normally, the reaction was continued for about three hours, and the effluent was then subjected to vacuum distillation to recover three fractions—a water fraction, an organic fraction and a residue fraction. The organic fraction was analyzed by vapor phase chromatography to determine yield and product identity. Yields are on an once-through basis.

TABLE I

| Catalyst | Yield of triethylene-diamine, wt. percent from N-aminoethyl-piperazine | Yield of 2-methyl-triethylene-diamine, wt. percent from N-hydroxy-ethyl-2-methylpiperazine |
|---|---|---|
| 10% $WO_3$, $Al_2O_3$ | 18 | 1 |
| $SiO_2$, $Al_2O_3$ | 22 | 2 |
| $AlPO_4$ | 32 | 50 |
| Lauric acid | 40-55 | 32 |

Thus, as shown by foregoing Table I, I have discovered that C-alkyl triethylenediamines or their precursors are more sensitive than triethylenediamine or its precursors and that unpredictably different degrees of response of the feed stocks to the catalyst occur.

As is shown by Table I, the aluminum phosphate catalyst of my copending patent applications was superior for the preparation of 2-alkyl triethylenediamines with reference to other catalysts that have been suggested for the manufacture of triethylene diamine. In the course of my further work, however, I have discovered that aluminum phosphate, per se, while satisfactory, leaves much to be desired in the way of performance. In particular, although aluminum phosphate, per se, is catalytically active, it tends to lose activity at a comparatively rapid rate during use.

In addition, I have discovered that commercially available aluminum phosphates and even synthetically prepared aluminum phosphates may differ significantly in their catalytic activity. This additional discovery of mine, illustrated by Table II, wherein N-hydroxyethylpiperazine was converted under comparable conditions using a commercial aluminum phosphate catalyst and an aluminum phosphate catalyst which I prepared from aluminum nitrate and trisodium phosphate, by precipitation from aqueous solution. The preparation of the precipitated catalyst is subsequently described in greater detail in the specification.

TABLE II

| Source of $AlPO_4$ | Yield of triethylene-diamine, wt. percent | Yield of 2-methyl-triethylene-diamine, wt. percent |
|---|---|---|
| Commercial | 19 | 47 |
| From $Al(NO_3)_3 + Na_3PO_4$ | 32 | 50 |

I have discovered that the principal significant difference between the two catalysts resides in their relative purity. Thus, the commercial aluminum phosphate catalyst was substantially completely free from sodium while the catalyst I prepared by precipitation contained about 17 wt. percent of sodium. Thus, another of my discoveries is that a significantly improved catalyst for the preparation of C-substituted triethylenediamines comprises a complex phosphate. I have also discovered that the crystallinity of the complex salt is significant. I have further discovered that the ratio of metal to alkali metal or alkaline earth metal is also a significant factor.

The catalyst compositions, therefore, to which the present invention is directed, are complex phosphates (orthophosphates, pyrophosphates, etc.), containing in their crystalline structure an alkali metal and from about one to about four mols per mol of alkali metal of a trivalent metal such as aluminum, boron, bismuth and iron. The alkali metal may suitably be sodium, potassium, lithium, rubidium or cesium.

The chemical identity of the phosphate will have a bearing on the optimum proportions of alkali metal to trivalent metal within the above-mentioned range. Thus, with orthophosphates, it is preferable to employ from about two to about four mols (and, still more preferably, about three mols) of trivalent metal per mol of alkali metal. However, with a pyrophosphate, it is preferable to employ one to about two mols of trivalent metal per mol of alkali metal.

I have further discovered that for best results, the catalyst composition should be composed of essentially amorphous phosphates having a maximum crystallite diameter of not more than about 200 angstrom units and that optimum results are obtained using phosphate crystallites having a maximum diameter of about 100 angstrom units.

In accordance with another embodiment of my invention, I have discovered an improved method for the synthesis of C-alkyl triethylenediamines of the formula:

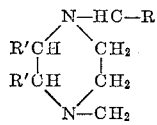

wherein R is a $C_1$ to $C_4$ alkyl group, and R′ is H or R; at least one of R′ being H.

These compounds are preferably prepared, in accordance with the present invention, by bringing a substituted piperazine, as hereafter defined, in vapor phase into contact with a complex phosphate catalyst, as above defined, in the presence of added ammonia at a temperature within the range of from about 250° to 550° C.; more preferably, from about 300° to about 450° C., and still more preferably, 375° to 400° C. (and preferably at about atmospheric pressure). The flow rate for the feed stock is suitably from about 0.1 to 10 (and preferably 0.5 to 1) pounds of feed per hour per pound of catalyst and the ammonia flow rate is suitably about 0.05 to about 1 (and preferably 0.1 to about 0.2) pounds of ammonia per hour per unit volume of catalyst. This corresponds to the use of about 1 to 15 mols (preferably 3 to 10) per mol of feed stock.

The substituted piperazine feed stock that is preferably employed in accordance wtih the present invention has the following formula:

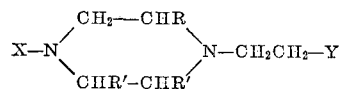

In the above formula, R is a $C_1$ to $C_4$ alkyl group and R′ is selected from the group consisting of hydrogen and $C_1$-$C_4$ groups, at least one R′ being hydrogen.

Y is selected from the group consisting of —OH and —$NH_2$, while X is selected from the group consisting of H and —$CH_2CH_2$—Y.

Representative examples of suitable feed stocks falling within the above formula which may be used alone, or in admixture with each other, include N-(hydroxyethyl)-2-methylpiperazine,
N,N′-(dihydroxyethyl)-2-methylpiperazine,
N-(aminoethyl)-2-methylpiperazine,
N,N′-(diaminoethyl)-2-methylpiperazine,
N-(hydroxyethyl)-2-ethylpiperazine,
N,N′-dihydroxyethyl-2-ethylpiperazine,
N-(aminoethyl)-2-ethylpiperazine,
N-(hydroxyethyl)-2-butylpiperazine,
N,N′-(dihydroxyethyl)-2-butylpiperazine,
N-(hydroxyethyl)-2,5-dimethylpiperazine,
N,N′-(dihydroxyethyl)-2,5-dimethylpiperazine,
N-(hydroxyethyl)-2,6-dimethylpiperazine,
N,N′-(dihydroxyethyl)-2,6-dimethylpiperazine,
N-(hydroxyethyl)-2,5,6-trimethylpiperazine,
N-(aminoethyl)-2,5-dimethylpiperazine,
N-(hydroxyethyl)-2,5-diethylpiperazine,
N-(aminoethyl)-2,5-diethylpiperazine,
N,N′-(dihydroxyethyl)-2,5-diethylpiperazine, etc.

The hydroxyethyl and di(hydroxyethyl) feed stocks of the present invention may be prepared conveniently, for example, by ethoxylating the corresponding C-alkyl substituted piperazine with ethylene oxide. Preferably, from one to two mols of ethylene oxide per mol of C-alkyl piperazine is used in order to obtain substantially complete conversion of the piperazine compound. As a consequence, a preferred feed stock will constitute a mixture of N-hydroxyethyl and the N,N′-(dihydroxyethyl)-C-alkyl piperazine.

Hydrogen may also be employed in the process, for example, as a purge or a carrier gas, although this is not absolutely necessary. Likewise, if desired, inert gases such as nitrogen may be employed without adverse results.

Although the feed materials may be employed in substantially anhydrous form, it is within the scope of this invention to use aqueous feed stocks containing up to about 50 wt. percent of water.

As has been indicated, the catalyst that is employed in accordance with the present invention is a complex phosphate containing both an alkali metal and a trivalent metal.

In general, three different procedures may be used to prepare the catalyst. Thus, the catalyst may be prepared by precipitation, by dry mixing or by wet mixing. The best results are obtained by wet mixing of the phosphate salts.

In the precipitation technique, two reactants, such as trisodium phosphate and aluminum nitrate or ferric nitrate, are dissolved in water in the desired proportions. As a consequence, the complex phosphate salt will precipitate and may be recovered from the resultant slurry by filtration, sedimentation, etc. The resultant precipitate, after drying, should be calcined (e.g., heated at a temperature within the range from about 300° to 500° C.). For industrial applications, it is preferable to employ a pelleted catalyst.

When the precipitation technique is involved, it is necessary to wash the precipitate in order to eliminate occluded soluble components. Care must be taken with this step or the alkali metal or alkaline earth metal cation component will be leached during the washing step.

In accordance with the dry-mixing technique, comparatively pure salts such as aluminum phosphate or ferric phosphate are mixed with comparatively pure cationic salts such as sodium phosphate, potassium phosphate, lithium phosphate, etc. Water is then added, and the resultant slurry is heated at the boiling point of water until the mixture is homogeneous. Thereafter, the water is removed (e.g., by evaporation), and the resultant composition is calcined as indicated.

In accordance with the mixed salt solution technique, separate aqueous solutions of the alkali metal phosphate and the trivalent metal phosphate are prepared and the two solutions are then mixed with agitation. Thereafter, water is evaporated and the mixed salts are recovered, pelleted, if desired, and calcined in the indicated fashion.

The invention will be further illustrated by the following specific examples, which are given by way of illustration and not as limitations on the scope of this invention.

EXAMPLE I

In preparing a catalyst, two mols of aluminum phosphate and one-half mol of trisodium phosphate were placed in an evaporating dish. The salts were mixed dry and sufficient water added to cover the solids. The mixture was heated to boiling on a hot plate and stirred until the pH had changed from a value of 11 to 7. The mixture was then placed in a furnace and calcined at 350° C. to provide the catalyst. The catalyst was tested in the manner described above in connection with Table I employing N-hydroxyethyl-2-methylpiperazine as the feed stock. A yield of only 42% 2-methyltriethylenediamine was obtained as compared with 47% for commercial aluminum phosphate. These catalyst characteristics were improved when the procedure was changed as follows:

EXAMPLE II

To a vessel with attached stirrer, thermometer and heating device were added three mols of aluminum phosphate and 500 ml. of water. The contents were stirred until homogeneous, heated to about 50° C. and a solution of one mol of tripotassium phosphate in 600 ml. of water added. The contents were stirred and heated to about 80° C., whereupon the pH changed to about seven and the mixture congealed. The catalyst mass was transferred to a furnace at 400° C. for about 16 hours. Conversion of a feed mixture comprising N-hydroxyethyl-2-methylpiperazine gave 50% 2-methyltriethylenediamine at 99% conversion; the catalyst after 40 hours continuous operation was still giving 50% yield of 2-methyltriethylenediamine.

The preparation and testing of analogous ferric orthophosphate catalysts gave even better results as shown in the following example.

EXAMPLE III

A catalyst was prepared using the procedure of Example II in which four mols of ferric orthophosphate were mixed with 700 ml. $H_2O$, heated with stirring to 50° C., and a solution of one mol of tripotassium phosphate in 150 ml. of water added. The heating and stirring were continued until about 80° C., whereupon the mass congealed and the pH changed to seven. After evaporation was completed, the complex phosphate was calcined at 400° C. for 16 hours. The feed of Example II was converted and an initial 2-methyltriethylenediamine yield of 60% at 100% conversion was obtained. After 144 hours of continuous operation, the yield and conversion had decreased to 55% and 98%, respectively. The initial yield of 2-methyltriethylenediamine using ferric orthophosphate was 48%.

EXAMPLE IV

Several catalysts were prepared by combining ferric orthophosphate with a variety of basic phosphates. In each catalyst about four mols of ferric orthophosphate per mol of alkali metal phosphate was used. The data below show the results obtained with the various reactants using a typical feed.

TABLE III

| Catalyst: | Yield of 2-methyltriethylenediamine, wt. percent |
|---|---|
| $FePO_4$ | 47 |
| $4FePO_4/Li_3PO_4$ | 52 |
| $4FePO_4/Na_3PO_4$ | 56 |
| $4FePO_4/K_3PO_4$ | 60 |
| $4FePO_4/0.5K_3PO_4$–$0.5Na_3PO_4$ | 55 |

As shown, high yields of 2-methyltriethylenediamine were obtained. The combination of both trisodium and tripotassium phosphate in the catalyst shows that mixed salts may be used.

The catalyst containing the tripotassium phosphate was of special interest. This catalyst was examined using the feed stock and reaction conditions noted in Table III. After 144 hours of continuous operation, the initial yield of more than 50% had declined by less than 10%, thus indicating that an active catalyst had been prepared.

A similar catalyst was made except that trisodium phosphate was utilized. With this catalyst, the initial yield was more than 50% of 2-methyltriethylenediamine, but this yield declined by more than 10% in just a few hours.

Because the latter two catalysts were made in otherwise identical procedures, it is to be concluded that the reaction of tripotassium phosphate with ferric orthophosphate occurred in such a way as to give a catalyst with enhanced catalytic properties.

EXAMPLE V

A study was made of the effect of the ferric orthophosphate-tripotassium phosphate ratio. Catalysts were prepared and tested according to the manner of Example III with the exception that the catalyst ratios were varied. The results are shown below.

TABLE IV

| Catalyst: | Yield of 2-methyltriethylenediamine, wt. percent |
|---|---|
| $K_3PO_4$ | 3 |
| $FePO_4$ | 47 |
| $2.8FePO_4$–$K_3PO_4$ | 51 |
| $3.5FePO_4$–$K_3PO_4$ | 54 |
| $4.1FePO_4$–$K_3PO_4$ | 56 |
| $5.5FePO_4$–$K_3PO_4$ | 53 |

This demonstrates that added tripotassium phosphate improved the catalyst with an optimum occurring at about four mols of ferric orthophosphate per mol of tripotassium phosphate, and that a suitable range of proportions is from about three to about six mols of ferric orthophosphate per mol of tripotassium phosphate.

EXAMPLE VI

When some of the above ferric orthophosphate catalysts were prepared and given life tests, good initial activities were obtained; however, the catalysts declined in a matter of a few hours. An X-ray diffraction study was made on several catalysts and reactants. The study revealed that the commercial white grade of ferric orthophosphate in use at the time was a very pure ferric orthophosphate dihydrate with a well-defined monoclinic lattice. In fact, reaction with tripotassium phosphate did not completely destroy the monoclinic lattice. This material gave a catalyst with high initial activity, but with a short life.

Commercial ferric orthophosphate obtained from a different source was also a dihydrate but the X-ray diffraction pattern revealed that the material was either amorphous or had crystallites less than 30 angstroms in diameter. This material was also somewhat impure in that 1% to 2% of calcium and several trace elements were present. Catalysts using tripotassium phosphate were prepared and tested using the procedure in Example II. For example, a catalyst in which 4.2 mols of ferric orthophosphate per mol tripotassium phosphate was amorphous gave an initial yield of more than 50% of 2-methyltriethylenediamine and the yield declined by less than 10% after 144 hours of continuous operation. In addition, 18% of residue and only about 5% cracked products were obtained.

EXAMPLE VII

The present invention includes other complex phosphate compositions. For example, bismuth and boron phosphates were complexed with tripotassium phosphate using the Example I procedure. The results are shown below.

| Catalyst: | Yield of 2-methyltriethylenediamine, wt. percent |
|---|---|
| $2BiPO_4$–$K_3PO_4$ | 25 |
| $2BPO_4$–$K_3PO_4$ | 39 |

These yields are lower than the best yields obtained using aluminum or ferric orthophosphate; however, desired product was obtained.

EXAMPLE VIII

Another composition which may prove to be useful are the pyrophosphates. Commercial sodium ferric pyrophosphate, $Na_8Fe_4(P_2O_7)_5$, was tableted and found to give a 48% yield of 2-methyltriethylenediamine; after 150 hours of continuous operation, the yield had dropped to 40%. The addition of an organic filler to this composition prior to tableting followed by burning the filler away after tableting resulted in a catalyst which gave a maximum yield of 2-methyltriethylenediamine of 57%, and which had declined to 53% after 48 hours of continuous operation. Thus, organic fillers improve substantially the nature of this catalyst.

A 4:1 ferric pyrophosphate-potassium pyrophosphate catalyst was prepared using the procedure in Example III. This catalyst gave a 50% yield of 2-methyltriethylenediamine which appeared to be constant after 48 hours of continuous operation.

EXAMPLE IX

Good complex phosphate catalysts of the approximate composition of those in foregoing examples can be prepared by precipitation. For example, upon mixing aqueous solutions of aluminum nitrate and tripotassium (or another alkali metal) phosphate, a precipitate is formed which is really a complex phosphate, as shown below:

$$Al(NO_3)_3 + K_3PO_4 \rightarrow AlPO_4 - K_3PO_4$$

Care must be taken to add an excess of the trialkali metal phosphate slowly and to avoid excessive washing of the resultant precipitate. An initial yield of 54% 2-methyltriethylenediamine was obtained, which had declined to 47% after 43 hours of continuous operation.

In a series of runs involving the reaction conditions of Example III and the catalyst of Example II, a variety of feed stocks were converted to bicyclic derivatives. Unless otherwise noted, temperature was about 400° C. The feed stocks employed, the reaction times and the results obtained are set forth in the following table.

Other compositions that I have discovered to be useful in accordance with the present invention are the pyrophosphates, and particularly pyrophosphates containing one to two mols of trivalent metal pyrophosphate per mol of alkali metal pyrophosphate.

A series of ferric pyrophosphates-potassium pyrophosphates were prepared by the wet mixing technique described above.

The first catalyst of the series contained about three mols of ferric phosphate per mol of pyrophosphate and when tested under conditions of Example III, it was found to give a yield of about 48.8% of 2-methytriethylenediamine.

When the molar ratio of ferric pyrophosphate to potassuim pyrophosphate was 2:1, the yield of 2-methyltriethylenediamine was 54 wt. percent and with a 1:1 molar ratio, the yield was 55 wt. percent.

In contrast, when ferric pyrophosphate was employed by itself as a feed stock, only a trace of 2-methyltriethylenediamine was obtained.

Also, attempts were made to prepare a pyrophosphate catalyst containing less than one mol of ferric pyrophosphate per mol of potassium phosphate. However, it was not possible to run a test, because the calcined product was so excessively friable it crumbled during calcining.

What is claimed is:

1. A method for preparing a catalytically active, catalytically stable complex phosphate salt which comprises the steps of mixing an aqueous solution of alkali metal phosphate with an aqueous solution of a trivalent metal phosphate, said trivalent metal having from about one to about four mols per mol of said alkali metal, removing water from said mixture to provide thereby a complex phosphate salt residue and calcining said residue at a temperature within the range of about 300° to about 500° C., said phosphates being essentially amorphous and having a maximum crystallite diameter of not more than 200 angstrom units, said trivalent metal phosphate being selected from the group consisting of aluminum, boron, bismuth and iron.

2. A method as in claim 1 wherein the phosphates are orthophosphates, the alkali metal phosphate is sodium phosphate, the trivalent metal phosphate is aluminum phosphate and the corresponding salt contains two to four atoms of aluminum per atom of sodium.

3. A method as in claim 1 wherein the phosphates are orth phosphates, the alkali metal phosphate is potassium phosphate, the trivalent metal phosphate is aluminum phosphate and the corresponding salt contains two to four atoms of aluminum per atom of sodium.

4. A method as in claim 1 wherein the phosphate is pyrophosphate, wherein the alkali metal phosphate is potassium pyrophosphate, wherein the trivalent metal phosphate is ferric pyrophosphate and wherein the correspond-

TABLE V.—SYNTHESIS OF TRIETHYLENEDIAMINE

| Feed | Space Velocity | | Yields, wt. Percent | | | |
|---|---|---|---|---|---|---|
| | Feed | NH₃ | Cracking | Residue | TEDA [1] | Compound [2] |
| N-hydroxyethylpiperazine | 0.4 | 0.1 | 44 | 17 | 39 | |
| N,N'-dihydroxyethyl-2,5- and -2,6-dimethylpiperazine | | | | 33 | | 5% MTEDA, 12% DMTEDA |
| N'-hydroxyethyl-3-methylpiperazine 20% H₂O | 0.6 | 0.1 | | 43 | 2 | 31% MTEDA |
| N-hydroxypropylpiperazine | 0.5 | 0.1 | 42 | 29 | | 9% MTEDA |
| N-hydroxyethyl-3-methylpiperazine | 0.3 | 0.1 | | 7 | | 50% MTEDA |
| Do | 0.6 | 0.1 | | 9 | | 50% MTEDA |
| N,N'-dihydroxyethylmethylpiperazine | 0.2 | 0.1 | 41 | 19 | | 40% MTEDA |
| Monohydroxyethyl-3-ethyl-piperazine | 0.5 | 0.1 | 43 | 7 | 50 | ETEDA |
| 4-hydroxyethyl-2,6-dimethylpiperazine | 0.5 | 0.1 | 75 | 6 | 19 | 2,6-DMTEDA |
| Hydroxyethyl-2,5-dimethylpiperazine | 0.4 | 0.09 | 7 | 62 | 31 | 2,5-DMTEDA |
| Hydroxyethyl-3-ethylpiperazine | 0.6 | 0.05 | 36 | 9 | 55 | ETEDA |
| Hydroxyethyl-3-methylpiperazine (temp.=350° C.) | 0.4 | | 38 | 27 | 35 | MTEDA |
| Hydroxyethyl-3-ethylpiperazine | 1.2 | 0.04 | 40 | 9 | 51 | ETEDA |

[1] TEDA=triethylenediamine.
[2] MTEDA=Methyltriethylenediamine; DMTEDA=Dimethyltriethylenediamine, ETEDA=ethyltriethylenediamine.

ing salt contains about one to two atoms of iron per atom of potassium.

References Cited
UNITED STATES PATENTS
| | | | |
|---|---|---|---|
| 2,230,648 | 2/1941 | Layng | 196—10 |
| 3,223,479 | 12/1965 | Van Strom | 23—107 |
| 3,223,480 | 12/1965 | Van Strom | 23—107 |
| 3,244,535 | 4/1966 | Lauck et al. | 99—117 |
| 3,311,448 | 3/1967 | Blanch et al. | 23—105 |
| 1,870,357 | 8/1932 | Dierichs | 252—423 |
| 2,060,871 | 11/1936 | Ipatieff | 252—435 |

OTHER REFERENCES
Van Wazer: "Phosphorus and Its Compounds," Interscience, 1958, vol. 1, p. 480.

OSCAR R. VERTIZ, *Primary Examiner.*

L. A. MARSH, *Assistant Examiner.*